US012502544B2

(12) United States Patent
Fischer et al.

(10) Patent No.: US 12,502,544 B2
(45) Date of Patent: Dec. 23, 2025

(54) LEAD IMPEDANCE MEASUREMENT FOR PHYSIOLOGICAL AND DEVICE MANAGEMENT

(71) Applicant: Medtronic, Inc., Minneapolis, MN (US)

(72) Inventors: Trent M. Fischer, St. Paul, MN (US); Deborah A. Jaye, Lino Lakes, MN (US); Geert G. Morren, Vissenaken (NL); Eric A. Schilling, Ham Lake, MN (US)

(73) Assignee: Medtronic, Inc., Minneapolis, MN (US)

( * ) Notice: Subject to any disclaimer, the term of this patent is extended or adjusted under 35 U.S.C. 154(b) by 631 days.

(21) Appl. No.: 17/878,557

(22) Filed: Aug. 1, 2022

(65) Prior Publication Data

US 2023/0068078 A1    Mar. 2, 2023

Related U.S. Application Data

(60) Provisional application No. 63/236,947, filed on Aug. 25, 2021.

(51) Int. Cl.
*A61N 1/37*     (2006.01)
*A61N 1/39*     (2006.01)

(52) U.S. Cl.
CPC ......... *A61N 1/3704* (2013.01); *A61N 1/3706* (2013.01); *A61N 1/3712* (2013.01); *A61N 1/3956* (2013.01)

(58) Field of Classification Search
CPC .. A61N 1/3704; A61N 1/3706; A61N 1/3712; A61N 1/3956

(Continued)

(56) References Cited

U.S. PATENT DOCUMENTS 5,741,311 A * 4/1998 Mc Venes ............ A61N 1/3706
607/28
5,782,884 A   7/1998 Stotts et al.
(Continued)

FOREIGN PATENT DOCUMENTS

CA          2206404 A1 *  6/1996  ........... A61N 1/3712
WO  WO-2012154733 A1 * 11/2012  ............. A61N 1/056

OTHER PUBLICATIONS (PCT/IB2022/057709) PCT Notification of Transmittal of the International Search Report and the Written Opinion of the International Searching Authority, dated Jan. 9, 2023, 28 pages.
(Continued)

*Primary Examiner* — Michael J Lau
(74) *Attorney, Agent, or Firm* — Shumaker & Sieffert, P.A.

(57) ABSTRACT

An example system includes memory configured to store a plurality of lead impedances (LeadZs) and processing circuitry communicatively coupled to the memory. The processing circuitry is configured to determine a first sensed LeadZ, and determine a second sensed LeadZ. The processing circuitry is configured to determine a first difference between the first sensed LeadZ and the second sensed LeadZ, and determine a parameter based at least in part on the first difference. The first sensed LeadZ and the second sensed LeadZ are sensed during a same first cardiac cycle or adjacent cardiac cycles of a heart that is receiving pacing.

19 Claims, 8 Drawing Sheets

(58) Field of Classification Search
USPC .......................................................... 607/17
See application file for complete search history.

(56) References Cited

U.S. PATENT DOCUMENTS

| | | | |
|---|---|---|---|
| 6,141,590 | A | 10/2000 | Renirie et al. |
| 6,339,724 | B1 * | 1/2002 | Thong ................. A61N 1/3712 |
| | | | 607/28 |
| 7,212,861 | B1 | 5/2007 | Park et al. |
| 7,228,174 | B2 | 6/2007 | Burnes et al. |
| 7,395,114 | B2 | 7/2008 | Czygan et al. |
| 7,435,221 | B1 | 10/2008 | Bharmi et al. |
| 8,271,072 | B2 * | 9/2012 | Houben ................ G16H 40/63 |
| | | | 128/923 |
| 8,386,041 | B2 | 2/2013 | Blomqvist et al. |
| 8,494,618 | B2 | 7/2013 | Zhang et al. |
| 8,923,965 | B2 | 12/2014 | Min et al. |
| 9,026,208 | B2 | 5/2015 | Morley et al. |
| 9,179,846 | B2 | 11/2015 | Hou et al. |
| 10,918,858 | B2 | 2/2021 | An et al. |
| 2006/0241711 | A1 * | 10/2006 | Sathaye ............... A61N 1/3712 |
| | | | 607/28 |
| 2010/0234906 | A1 | 9/2010 | Koh |
| 2011/0046691 | A1 | 2/2011 | Björling et al. |
| 2015/0202443 | A1 * | 7/2015 | Zielinski .............. A61B 5/0538 |
| | | | 607/18 |
| 2015/0231399 | A1 * | 8/2015 | Demmer ................ A61B 5/388 |
| | | | 607/28 |
| 2015/0246235 | A1 * | 9/2015 | Ghosh ..................... A61B 5/35 |
| | | | 607/28 |
| 2019/0329046 | A1 * | 10/2019 | Sambelashvili ..... A61N 1/3682 |
| 2019/0374695 | A1 * | 12/2019 | Kheradvar .......... A61M 60/408 |
| 2020/0254262 | A1 * | 8/2020 | Demmer ............ A61N 1/36189 |
| 2020/0261731 | A1 * | 8/2020 | Ghosh ................. A61N 1/3627 |

OTHER PUBLICATIONS

International Preliminary Report on Patentability from International Application No. PCT/IB2022/057709 dated Feb. 27, 2024, 22 pp.
Response to Communication Pursuant to Rules 161(1) and 162 EPC dated Apr. 4, 2024, from counterpart European Application No. 22782760.7, filed Sep. 26, 2024, 23 pp.

* cited by examiner

LEAD IMPEDANCE MEASUREMENT FOR PHYSIOLOGICAL AND DEVICE MANAGEMENT

RELATED APPLICATIONS

This application claims the benefit of U.S. Provisional Application Ser. No. 63/236,947, filed Aug. 25, 2021, the entire contents of each of which are incorporated herein by reference.

TECHNICAL FIELD

This disclosure relates generally to implantable medical devices, and more specifically, to implantable medical devices having one or more leads.

BACKGROUND

Implantable medical devices (IMDs) may be surgically implanted in a patient to monitor one or more physiological parameters of the patient and/or deliver therapy to suppress one or more symptoms of the patient. For example, an IMD may comprise a cardiac monitor, be configured to deliver cardiac pacing or another stimulation therapy to the patient, and/or be configured to terminate tachyarrhythmia by delivery of high energy shocks. Such an IMD may include or be coupled to one or more leads which may include electrodes for delivering therapy and/or sensing the one or more physiological parameters of the patient. A clinician or patient may use an external computing device to retrieve information collected by the IMD and/or to configure or adjust one or more parameters of the therapy provided by the IMD.

SUMMARY

In general, the disclosure describes techniques for sensing physiological parameters of a patient using lead impedance (LeadZ) of an implantable medical device (IMD). LeadZ may be used for lead management purposes in IMDs, where regular measurements of impedance during pacing provide an indication of whether a lead problem has occurred. Lead dislodgements, lead integrity issues, or loosening of a lead from the IMD may be determined through changes in LeadZ over time. LeadZ may also be used to determine physiological parameters of a patient. For example, LeadZ may be used to sense respiration of a patient, to derive physiologic indices of contractility, may be used in capture management, effective capture management, rate responsive pacing, rate-adaptive AV interval management, capture of selective or area left bundle branch block (LBBB) and bundle of His, entrained capture of antitachycardia pacing (ATP), determine perfusion of tachycardia, pulseless electrical activation detection, among others.

In one example, this disclosure describes a method including determining a first sensed lead impedance (LeadZ); determining a second sensed LeadZ; determining a first difference between the first sensed LeadZ and the second sensed LeadZ; and determining a parameter based at least in part on the first difference, wherein the first sensed LeadZ and the second sensed LeadZ are sensed during a same first cardiac cycle of a heart that is receiving pacing.

In another example, this disclosure describes a system including a memory configured to store a plurality of lead impedances (LeadZs) sensed by a medical device; and processing circuitry communicatively coupled to the memory, the processing circuitry being configured to: determine a first sensed lead impedance (LeadZ); determine a second sensed LeadZ; determine a first difference between the first sensed LeadZ and the second sensed LeadZ; and determine a parameter based at least in part on the first difference, wherein the first sensed LeadZ and the second sensed LeadZ are sensed during a same first cardiac cycle of a heart that is receiving pacing.

In another example, this disclosure describes a non-transitory computer readable medium storing instructions, which when executed by processing circuitry cause the processing circuitry to: determine a first sensed lead impedance (LeadZ); determine a second sensed LeadZ; determine a first difference between the first sensed LeadZ and the second sensed LeadZ; and determine a parameter based at least in part on the first difference, wherein the first sensed LeadZ and the second sensed LeadZ are sensed during a same first cardiac cycle of a heart that is receiving pacing.

This summary is intended to provide an overview of the subject matter described in this disclosure. It is not intended to provide an exclusive or exhaustive explanation of the apparatus and methods described in detail within the accompanying drawings and description below. Further details of one or more examples are set forth in the accompanying drawings and the description below.

BRIEF DESCRIPTION OF DRAWINGS

Like reference characters refer to like elements throughout the figures and description.

DETAILED DESCRIPTION

Various medical devices, including implantable medical devices (IMDs) such as pacemakers, may include or be coupled to leads which may include electrodes to provide pacing to the heart of a patient and/or sense physiological parameters of the patient. An IMD may be powered by a rechargeable or non-rechargeable battery.

Biological impedance (BioZ) may be used in IMDs for high-fidelity acute sensing from different programmable vectors, and may be used to sense certain physiological parameters of the patient, such as respiratory rate. BioZ can be sensed from a can electrode on the IMD to a coil electrode on a lead and be filtered to determine the respiratory rate of the patient. However, BioZ may have a relatively high sampling rate and may incur a significant current drain on the battery of the IMD, which may preclude the continuous use of BioZ. However, in some instances, continuous sensing of physiological parameters may be highly desirable, such as sensing of respiratory rate in a cardiac patient having sleep apnea, chronic obstructive pulmonary disease (COPD), or other respiratory issues. Therefore, there may be a need for different, less power intensive, techniques for sensing a chronic respiratory rate and other physiological and device parameters. LeadZ may be used to address this need. LeadZ is a measurement of impedance between a lead and tissue. For example, changes over a plurality of measurements of LeadZ during a cardiac cycle to derive physiologic indices of contractility, may be used in capture management, effective capture management, rate responsive pacing, rate-adaptive AV interval management, capture of selective or area left bundle branch block (LBBB) and bundle of His, entrained capture of antitachycardia pacing (ATP), determining perfusion of tachycardia, pulseless electrical activation detection, among others.

In some examples, LeadZ may be sensed from right ventricle ring electrode to right ventricle coil electrode, however other electrode configurations are also envisioned. LeadZ may be sensed during one or more parts of a respective cardiac cycles during a pace in a paced beat or during the absolute refractory period in the case of a sensed beat. The sensed LeadZ may be taken at specific points of a cardiac cycle (e.g., T wave peak), at preset time intervals over the course of a cycle (e.g., every 400 ms), or combinations thereof. For chronic measurement of respiratory rate, LeadZ can be used, whereby a measurement of the impedance is taken during each pace on a lead, or during a stimulation on the lead during the absolute refractory period of the chamber in which the lead resides subsequent to the pace. As described further below, the short-term (e.g., intra-beat measurements) and longer-term (e.g., during respiration) trends of the LeadZ can be used to determine one or more physiological parameters of a patient and pacing may be adjusted accordingly.

Figure 1:
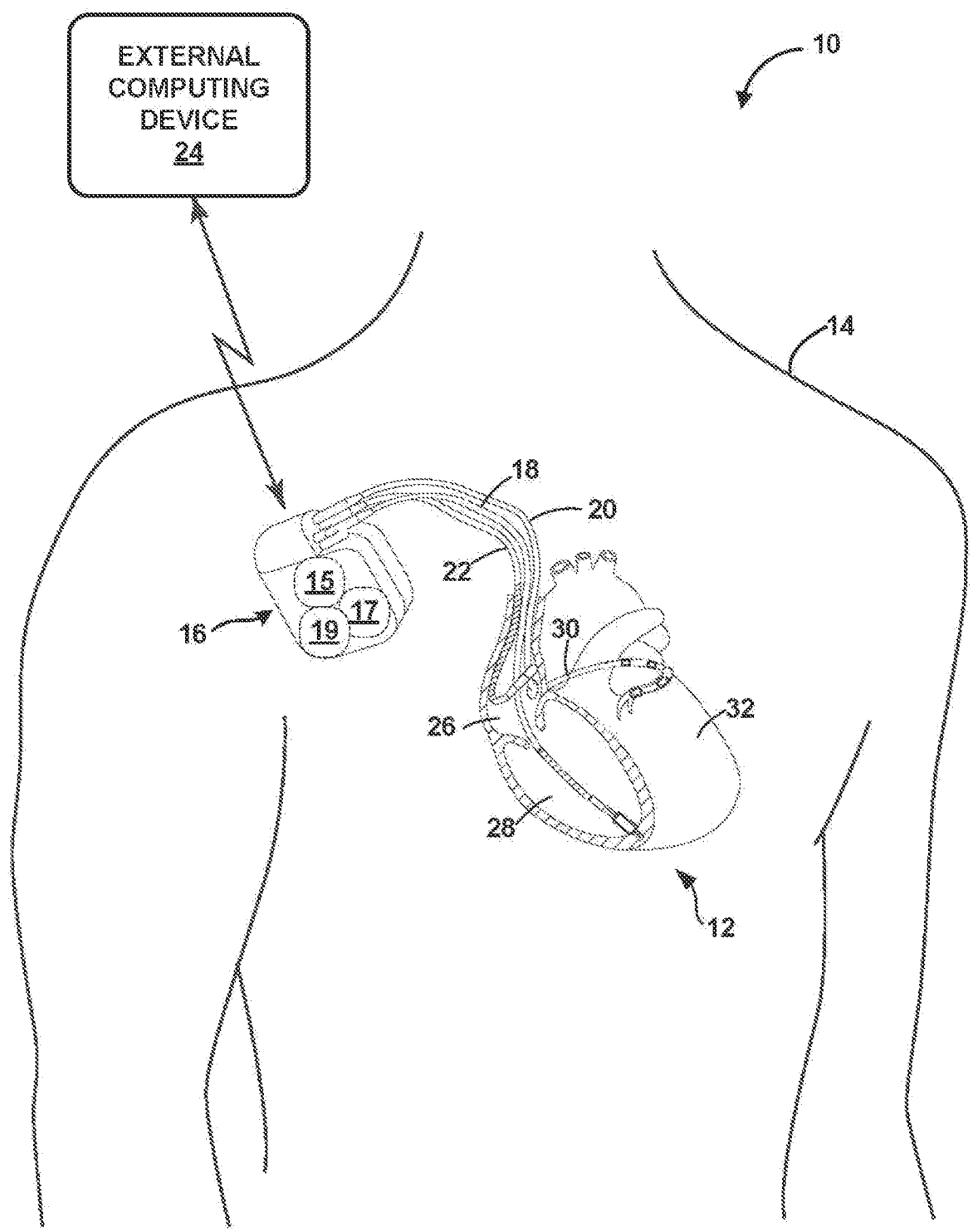
FIG. 1 is a conceptual diagram illustrating a system which may be used to monitor physiological parameters of a patient in accordance with the techniques of the disclosure.

FIG. 1 is a block diagram illustrating system 10 which may be used to monitor physiological parameters of a patient in accordance with the techniques of the disclosure. As illustrated by example system 10 in FIG. 1, IMD 16 may, in some examples, be an implantable cardiac pacemaker, implantable cardioverter/defibrillator (ICD), or pacemaker/cardioverter/defibrillator, for example. While primarily described herein with respect to an implantable cardiac pacemaker, the techniques of this disclosure may be used with any implantable medical device having a lead or coupled to a lead that is configured to sense LeadZ.

IMD 16 is connected to leads 18, 20 and 22 and is communicatively coupled to external computing device 24. IMD 16 senses electrical signals attendant to the depolarization and repolarization of heart 12, e.g., a cardiac electrogram (EGM), via electrodes on one or more leads 18, 20 and 22 or the housing of IMD 16. In some examples, IMD 16 may sense LeadZ between a right ventricle ring electrode to right ventricle coil electrode. IMD 16 may also deliver therapy in the form of electrical signals to heart 12 via electrodes located on one or more leads 18, 20 and 22 or a housing of IMD 16. The therapy may be pacing, cardioversion and/or defibrillation pulses. IMD 16 may monitor EGM signals collected by electrodes on leads 18, 20 or 22, and based on the EGM signal, diagnose, and treat cardiac episodes. IMD 16 may include LeadZ circuitry 19 that is configured to determine a LeadZ value based on sensed signals.

In some examples, IMD 16 includes communication circuitry 17 including any suitable circuitry, firmware, software, or any combination thereof for communicating with another device, such as external computing device 24 of FIG. 1. For example, communication circuitry 17 may include one or more processors, memory, wireless radios, antennae, transmitters, receivers, modulation and demodulation circuitry, filters, amplifiers, or the like for radio frequency communication with other devices, such as external computing device 24. IMD 16 may use such communication circuitry to, for example, transmit one or more advertisements indicating the availability of the IMD for a wireless connection during a period of time wherein IMD 16 is discoverable. Upon establishing a wireless connection to external computing device 24, IMD 16 may use communication circuitry 17 to receive data from external computing device 24 to control one or more operations of IMD 16 and/or send uplinked data, such as sensed physiological parameters, to external computing device 24.

In some examples, IMD 16 includes processing circuitry 15. Processing circuitry 15 may be configured to implement functionality ascribed to IMD 16 and/or process instructions for execution within IMD 16. For example, processing circuitry 15 may be capable of processing instructions stored in memory of IMD 16 (not shown). In some examples, processing circuitry includes LeadZ circuitry 19. In some examples, processing circuitry 15 may be configured to evaluate EGM signals or other physiological parameters sensed by IMD 16. For example, processing circuitry 15 may determine contractility, analyze capture management of paced beats, evaluate effective capture of paced beats, analyze rate responsive pacing, analyze rate adaptive atrioventricular intervals, analyze capture of selective or area LBBB or bundle of His, analyze entrained capture of ATP, determine perfusion of tachyarrhythmia, detect pulseless electrical activation (where a QRS complex is not accompanied by a meaningful beat), etc.

Examples of processing circuitry 15 may include, any one or more of a microprocessor, a controller, a digital signal processor (DSP), an application specific integrated circuit (ASIC), a field-programmable gate array (FPGA), or equivalent discrete or integrated logic circuitry.

Leads 18, 20, 22 extend into the heart 12 of patient 14 to sense electrical activity of heart 12 and/or deliver electrical stimulation to heart 12. In the example shown in FIG. 1, right ventricular (RV) lead 18 extends through one or more veins (not shown), the superior vena cava (not shown), and right atrium 26, and into right ventricle 28. Left ventricular (LV) lead 20 extends through one or more veins, the vena cava, right atrium 26, and into the coronary sinus 30 to a region adjacent to the free wall of left ventricle 32 of heart 12. Right atrial (RA) lead 22 extends through one or more veins and the vena cava, and into the right atrium 26 of heart 12.

In some examples, external computing device 24 takes the form of a handheld computing device, computer workstation, networked computing device, smart phone, tablet, laptop computer, external programmer, or external monitor that includes a user interface for presenting information to and receiving input from a user. A user, such as a physician, technician, surgeon, electro-physiologist, other clinician, clinician, or patient, may interact with external computing device 24 to retrieve physiological or diagnostic information from IMD 16. A user may also interact with external computing device 24 to program IMD 16, e.g., select values for operational parameters of the IMD. External computing device 24 may include a processor configured to evaluate EGM signals or other physiological parameters transmitted from IMD 16 to external computing device 24. For example, external computing device 24 may determine contractility, analyze capture management of paced beats, evaluate effective capture of paced beats, analyze rate responsive pacing, analyze rate adaptive atrioventricular intervals, analyze capture of selective or area LBBB or bundle of His, analyze entrained capture of ATP, determine perfusion of tachyarrhythmia, detect pulseless electrical activation (where a QRS complex is not accompanied by a meaningful beat), etc. While the evaluation of EGM signals or other physiological parameters has been described as being performed by processing circuitry 15 of IMD 16 and as being performed by processing circuitry of external computing device 24, in some examples the techniques of this disclosure may be performed by a combination of processing circuitry 15 and processing circuitry of external computing device 24.

IMD 16 and external computing device 24 may communicate via wireless communication using any techniques known in the art. Examples of communication techniques may include, for example, communication according to a personal area network technology, such as the Bluetooth® or BLE protocols. Other communication techniques are also contemplated. External computing device 24 may also communicate with one or more other external computing devices using a number of known communication techniques, both wired and wireless.

In accordance with the techniques of the disclosure, devices, systems, and techniques for determining parameters using LeadZ are described. For example, processing circuitry 15 and/or processing circuitry of external computing device 24 may determine a first sensed lead impedance (LeadZ), determine a second sensed LeadZ, determine a first difference between the first sensed LeadZ and the second sensed LeadZ, and determine a parameter based at least in part on the first difference. The first sensed LeadZ and the second sensed LeadZ may be sensed during a same first cardiac cycle of a heart that is receiving pacing.

Figure 2:
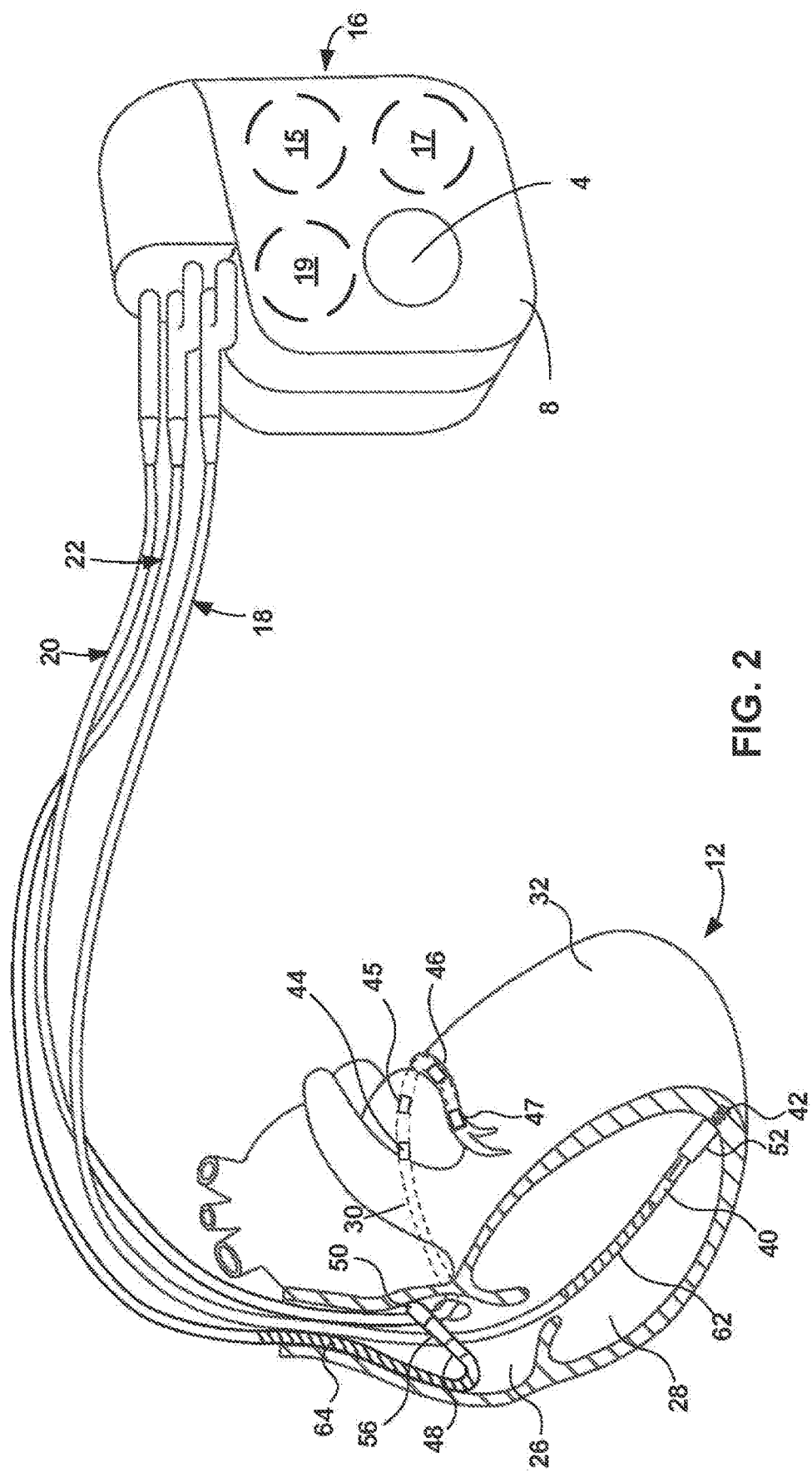
FIG. 2 is a conceptual diagram illustrating the IMD and leads of the system of FIG. 1 in greater detail.

FIG. 2 is a conceptual diagram illustrating IMD 16 and leads 18, 20 and 22 of system 10 in greater detail. In the illustrated example, bipolar electrodes 40 and 42 are located adjacent to a distal end of lead 18, and bipolar electrodes 48 and 50 are located adjacent to a distal end of lead 22. In addition, four electrodes 44, 45, 46 and 47 are located adjacent to a distal end of lead 20. Lead 20 may be referred to as a quadrapolar LV lead. In other examples, lead 20 may include more or fewer electrodes. In some examples, LV lead 20 comprises segmented electrodes, e.g., in which each of a plurality of longitudinal electrode positions of the lead, such as the positions of electrodes 44, 45, 46 and 47, includes a plurality of discrete electrodes arranged at respective circumferential positions around the circumference of lead.

In the illustrated example, electrodes 40 and 44-48 take the form of ring electrodes, and electrodes 42 and 50 may take the form of extendable helix tip electrodes mounted retractably within insulative electrode heads 52 and 56, respectively. Leads 18 and 22 also include elongated electrodes 62 and 64, respectively, which may take the form of a coil. In some examples, each of electrodes 40, 42, 44-48, 50, 62, and 64 is electrically coupled to a respective conductor within the lead body of its associated lead 18, 20, 22 and thereby coupled to circuitry within IMD 16.

In some examples, IMD 16 includes one or more housing electrodes, such as housing electrode 4 (which may also be referred to as a can electrode) illustrated in FIG. 2, which may be formed integrally with an outer surface of hermetically-sealed housing 8 of IMD 16 or otherwise coupled to housing 8. In some examples, housing electrode 4 is defined by an uninsulated portion of an outward facing portion of housing 8 of IMD 16. Other divisions between insulated and uninsulated portions of housing 8 may be employed to define two or more housing electrodes. In some examples, a housing electrode comprises substantially all of housing 8.

Housing 8 encloses a signal generator that includes circuitry configured to generate therapeutic stimulation, such as cardiac pacing, cardioversion, and defibrillation pulses, as well as a sensing module that includes circuitry configured for sensing electrical signals attendant to the depolarization and repolarization of heart 12. Housing 8 may also enclose a memory for storing the sensed electrical signals. Housing 8 may also enclose communication circuitry 17 for communication between IMD 16 and external computing device 24. For example, communication circuitry 17 may be configured to communicate with external computing device 24 via a personal area networking technology, such as Bluetooth® or BLE wireless protocol. In addition, or alternatively, communication circuitry 17 may be configured to communicate with external computing device 24 via another wireless technology, such as a cellular or local area network wireless technology. IMD 16 may use communication circuitry 17 for communicating with a patient device and/or a clinician device.

IMD 16 senses electrical signals attendant to the depolarization and repolarization of heart 12 via electrodes 4, 40, 42, 44-48, 50, 62, and 64. IMD 16 may sense such electrical signals via any bipolar combination of electrodes 40, 42, 44-48, 50, 62, and 64. Furthermore, any of the electrodes 40, 42, 44-48, 50, 62, and 64 may be used for unipolar sensing in combination with housing electrode 4. For example, IMD 16 may sense LeadZ between a right ventricle ring electrode and a right ventricle coil electrode.

The illustrated numbers and configurations of leads 18, 20 and 22 and electrodes are merely examples. Other configurations, i.e., number and position of leads and electrodes, are possible. In some examples, system 10 may include an additional lead or lead segment having one or more electrodes positioned at different locations in the cardiovascular system for sensing and/or delivering therapy to patient 14. For example, instead of or in addition to intracardiac leads 18, 20 and 22, system 10 may include one or more epicardial or extravascular (e.g., subcutaneous or substernal) leads not positioned within heart 12.

Figure 3:
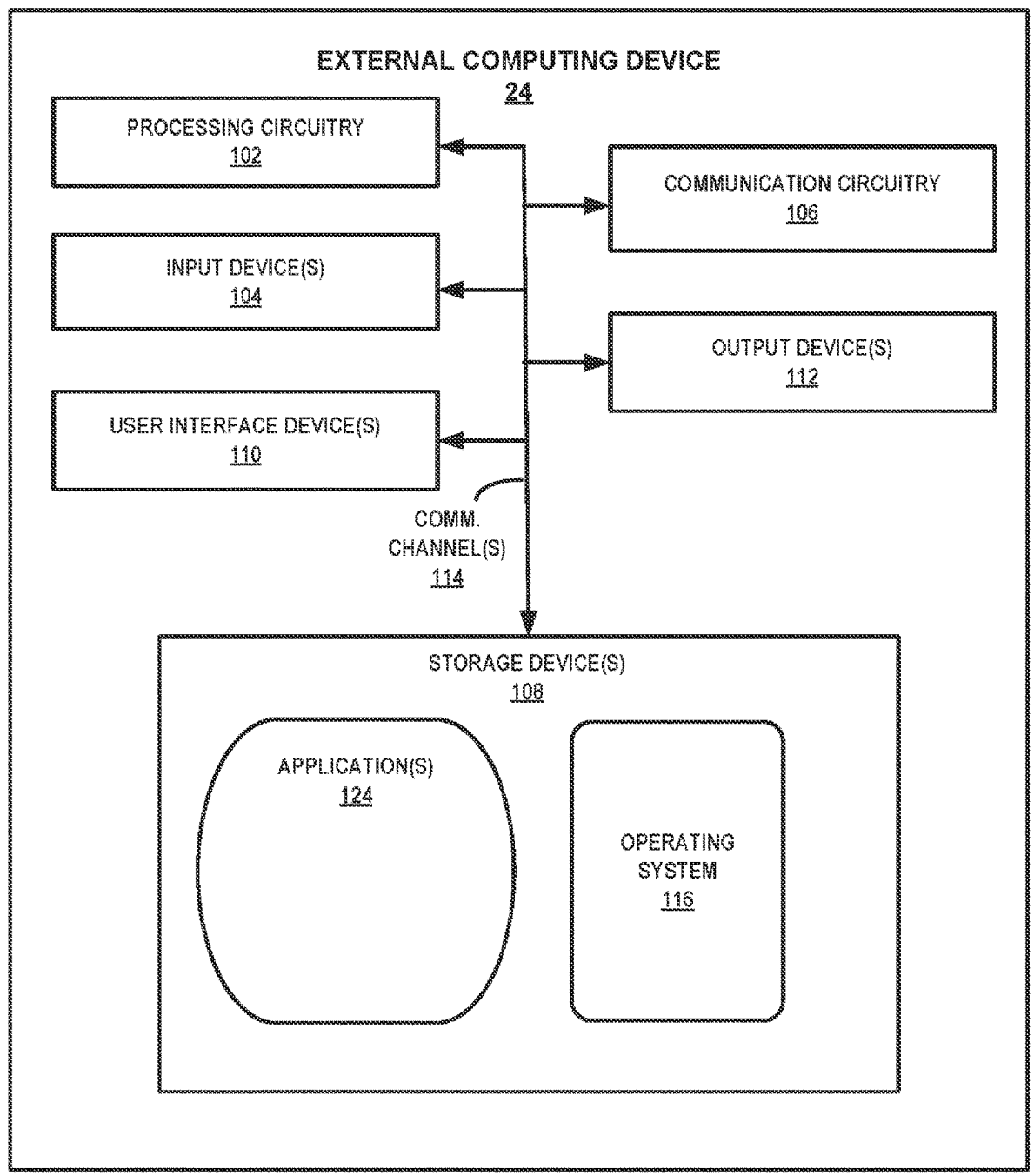
FIG. 3 is a block diagram illustrating an example external computing device in accordance with the techniques of the disclosure.

FIG. 3 is a block diagram illustrating an example external computing device 24 that operates in accordance with one or more techniques of the present disclosure. In one example, external computing device 24 includes processing circuitry 102 for executing applications 124 described herein. Although shown in FIG. 3 as a stand-alone external computing device 24 for purposes of example, external computing device 24 may be any component or system that includes processing circuitry or other suitable computing environment for executing software instructions and, for example, need not necessarily include one or more elements shown in FIG. 3 (e.g., communication circuitry 106; and in some examples components such as storage device(s) 108 may not be co-located or in the same chassis as other components). In some examples, external computing device 24 may be a cloud computing system distributed across a plurality of devices.

As shown in the example of FIG. 3, external computing device 24 includes processing circuitry 102, one or more input devices 104, communication circuitry 106, one or more output devices 112, one or more storage devices 108, and user interface (UI) device(s) 110. External computing device 24, in one example, further includes one or more application(s) 124, and operating system 116 that are executable by external computing device 24. Each of components 102, 104, 106, 108, 110, and 112 are coupled (physically, communicatively, and/or operatively) for inter-component communications. In some examples, communication channels 114 may include a system bus, a network connection, an inter-process communication data structure, or any other method for communicating data. As one example, components 102, 104, 106, 108, 110, and 112 may be coupled by one or more communication channels 114.

Processing circuitry 102, in one example, is configured to implement functionality and/or process instructions for execution within external computing device 24. For example, processing circuitry 102 may be capable of processing instructions stored in one or more storage devices 108. For example, processing circuitry 102 may determine contractility, analyze capture management of paced beats, evaluate effective capture of paced beats, analyze rate responsive pacing, analyze rate adaptive atrioventricular intervals, analyze capture of selective or area LBBB or bundle of His, analyze entrained capture of ATP, determine perfusion of tachyarrhythmia, detect pulseless electrical activation (where a QRS complex is not accompanied by a meaningful beat), etc. Examples of processing circuitry 102 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 108 may be configured to store information within external computing device 24 during operation. One or more storage devices 108, in some examples, are described as a computer-readable storage medium. In some examples, one or more storage devices 108 is a temporary memory, meaning that a primary purpose of one or more storage devices 108 is not long-term storage. One or more storage devices 108, in some examples, is described as a volatile memory, meaning that storage device 108 does not maintain stored contents when the computer is turned off. Examples of volatile memories include random access memories (RAM), dynamic random access memories (DRAM), static random access memories (SRAM), and other forms of volatile memories known in the art. In some examples, one or more storage devices 108 are used to store program instructions for execution by processing circuitry 102. One or more storage devices 108, in one example, are used by software or applications 124 running on external computing device 24 to temporarily store information during program execution.

One or more storage devices 108, in some examples, also include one or more computer-readable storage media. One or more storage devices 108 may be configured to store larger amounts of information than volatile memory. One or more storage devices 108 may further be configured for long-term storage of information. In some examples, one or more storage devices 108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

External computing device 24, in some examples, also includes communication circuitry 106. External computing device 24, in one example, utilizes communication circuitry 106 to communicate with IMD 16 or other external computing devices (not shown). Communication circuitry 106 may include a network interface card, such as an Ethernet card, an optical transceiver, a radio frequency transceiver, or any other type of device that can send and receive information. Other examples of such network interfaces may include Bluetooth®, 3G, 4G, 5G, and WiFi radios.

External computing device 24, in one example, also includes one or more user interface devices 110. One or more user interface devices 110, in some examples, are configured to receive input from a user through tactile, audio, or video feedback. Examples of one or more user interface devices 110 include a presence-sensitive display, a mouse, a keyboard, a voice responsive system, video camera, microphone or any other type of device for detecting a command from a user. In some examples, a presence-sensitive display includes a touch-sensitive screen.

One or more output devices 112 may also be included in external computing device 24. One or more output devices 112, in some examples, is configured to provide output to a user using tactile, audio, or video stimuli. One or more output devices 112, in one example, includes a presence-sensitive display, a sound card, a video graphics adapter card, or any other type of device for converting a signal into an appropriate form understandable to humans or machines. Additional examples of one or more output devices 112 include a speaker, a cathode ray tube (CRT) monitor, a liquid crystal display (LCD), or any other type of device that can generate intelligible output to a user.

External computing device 24 may include operating system 116. Operating system 116, in some examples, controls the operation of components of external computing device 24. For example, operating system 116, in one example, facilitates the communication of one or more applications 124 with processing circuitry 102, communication circuitry 106, one or more storage devices 108, one or more input devices 104, one or more user interface devices 110, and one or more output devices 112.

Application(s) 124 may also include program instructions and/or data that are executable by external computing device 24. Example application(s) 124 executable by external computing device 24 may include applications configured to perform the techniques of this disclosure. Other additional applications not shown may alternatively or additionally be included to provide other functionality described herein and are not depicted for the sake of simplicity.

In accordance with the techniques of the disclosure, processing circuitry 15 and/or processing circuitry 102 may determine a first sensed lead impedance (LeadZ), determine a second sensed LeadZ, determine a first difference between the first sensed LeadZ and the second sensed LeadZ, and determine a parameter based at least in part on the first difference. The first sensed LeadZ and the second sensed LeadZ may be sensed during a same first cardiac cycle of a heart that is receiving pacing, which can be used to determine that cycle's ejection fraction, contractility, or other useful information. Additionally, or alternatively, the first sensed LeadZ and the second sensed LeadZ may be sensed during different cardiac cycles (e.g., adjacent cycles) of a heart to determine the respiratory status of the patient.

Figure 4:
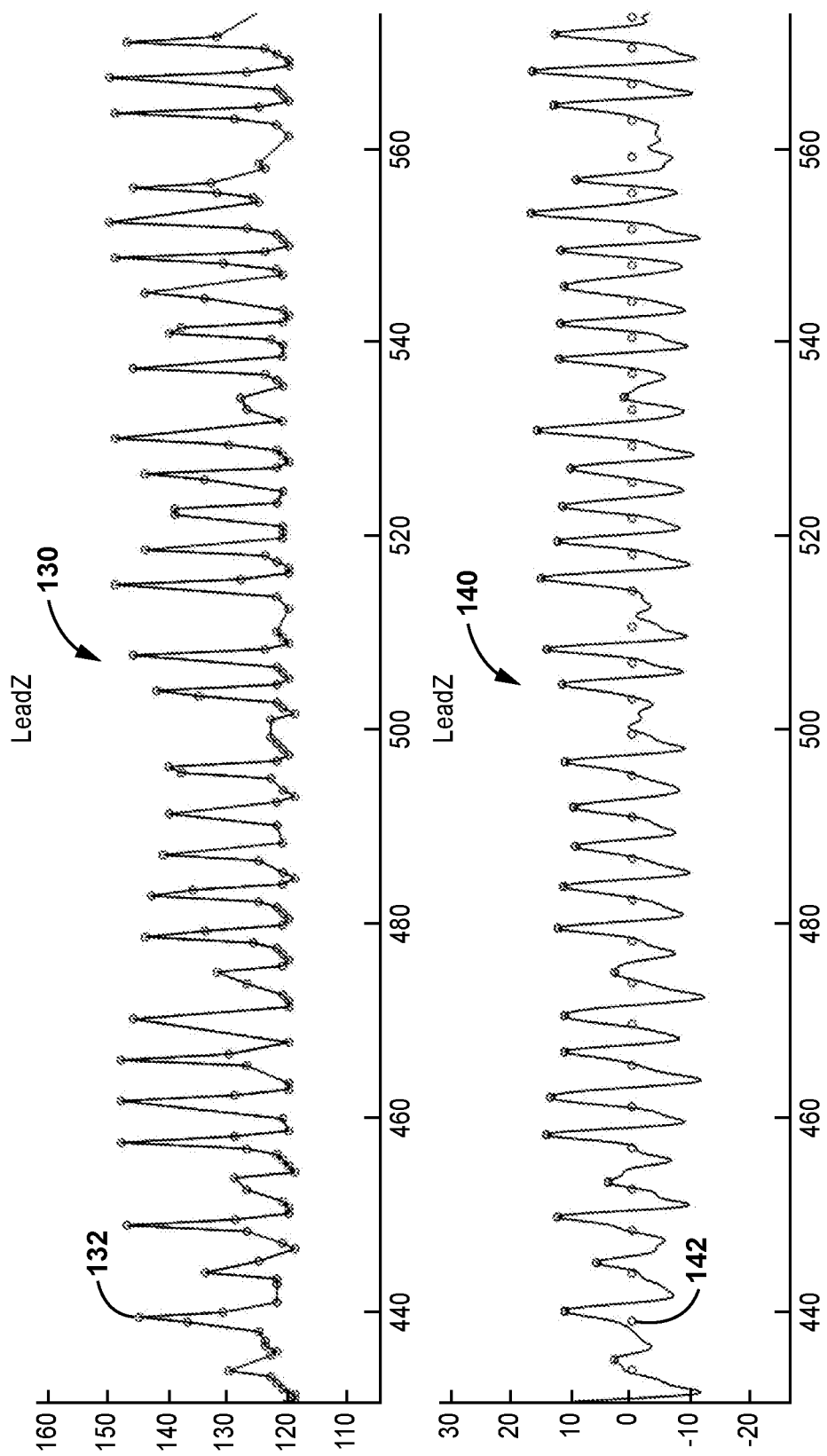
FIG. 4 is a graphical diagram illustrating the sensing of respiration using LeadZ according to the techniques of this disclosure.

FIG. 4 is a graphical diagram illustrating the sensing of respiration using LeadZ according to the techniques of this disclosure. The technique of using LeadZ for respiratory status measurement includes sensing LeadZ one or more times during each cardiac beat and analyzing the trend of LeadZ over a series of cardiac cycles. In some examples, an indication of a phase of a cardiac cycle (e.g., peak of the T-wave or peak QRS amplitude), a pacing rate (e.g., set time interval), combinations thereof or the like may be used to determine when to sense LeadZ. The heart rate will likely be faster than the respiratory rate, so there may be a plurality of beats per respiratory cycle, such as on the order of between three and five beats per respiratory cycle.

From the sensed LeadZ discrete points, processing circuitry 102 (FIG. 3) may create a continuous waveform by interpolation between the discrete points. Processing circuitry 15 and/or processing circuitry 102 may also process the continuous waveform to determine the breaths or respiratory state of patient 14 (FIG. 1). For example, in graph 130 each circle, such as circle 132, represents a sensing of LeadZ once per cardiac cycle. The observed periodic oscillation in LeadZ (e.g., peak to peak) represents changes affiliated with a respiratory cycle. In graph 140 (post processing of graph 130), each circle located at 0 on the Y-axis, such as circle 142, represents a breath. Furthermore, trend changes in LeadZ (e.g., decreasing or increasing) over a respective respiratory cycle may indicate a respiratory state (e.g., inspiration or expiration). Processing circuitry 102 may interpolate between the sensed LeadZs, may filter the interpolated signal and use peak detection, valley detection, or zero crossings, to determine the respiratory rate, respiratory state, or the like of patient 14.

In some examples, determination of the respiratory rate or state of the patient using LeadZ, may be used to adjust the pacing rate of IMD 16. For example, in normal breathing, heart rate is non-uniform. There is normal variation up and down, which gives a measure of heart rate variability. Included in this is respiratory sinus arrhythmia (RSA). In RSA, heart rate normally increases during inspiration, and decreases during expiration. Mechanisms behind this include a lowered intrathoracic pressure during inspiration, which leads to increased venous return to the heart. This increased venous return leads to increased contractility by the Frank-Starling mechanism and increased heart rate. Additionally, there may be a slight delay between the exact phases of inspiration and expiration and the increased heart rate. When the heart is paced via a set heart rate, RSA is lost which may contribute to sub-optimal outcomes. By determining the respiratory rate or respiratory state of the patient based on LeadZ, IMD 16 may be configured to slightly increase the pacing rate during inspiration and slightly decrease the pacing rate during expiration to restore RSA. In some examples, this change in pacing rate, corresponding with restored RSA, may be on the order of about plus or minus 2 beats per minute.

As described further below, during a normal cardiac cycle, the LeadZ will change corresponding with the volume within the heart. In addition to this, during a respiratory cycle, there may also be a periodic oscillation in LeadZ measurements corresponding with the inspiration and expiration, imposed over the short-term change in the LeadZ measurement of a normal cardiac cycle. For example, during inspiration there is more venous return, and ventricular volumes will be generally larger at the beginning of systole, thus LeadZ will be lower. Likewise, during expiration there is less venous return, and ventricular volumes will be comparably lower at the beginning of systole, thus LeadZ will be comparably higher. This longer-term, respiratory-based, oscillation in LeadZ may be measured in addition to the short-term, periodic oscillation associated ventricular emptying and contractility observed in a single cardiac cycle. Taking advantage of both the respiration-based changes and the cardiac cycle-based changes in LeadZ can be used to determine both the state of inspiration/expiration and the contractility or ejection fraction of the heart and may be used to determine one or more other physiological parameters, health conditions of the patient, or the like. Additionally, or alternatively, such measurements may be used to modify the pacing parameters of IMD 16.

In some examples, respiration rate or respiratory state may be observed by measuring LeadZ, at least once per cardiac cycle, over a plurality of cardiac cycles, and determining the periodic change in LeadZ affiliated with respiration. For example, IMD 16 may be configured to sense LeadZ with each beat or at multiple times per beat, at common increments. In some examples, the sensed LeadZ may be sensed during a sensing phase such as the start of the T-wave, peak amplitude of the QRS complex, or the like; at a set interval (e.g., affiliated with the pacing rate), or combinations thereof. In some such examples, the pacing may be overdriven to ensure the likelihood that all beats are paced beats. Processing circuitry 15 and/or processing circuitry 102 may be configured to interpolate between the sensed LeadZ signal to provide an interpolated LeadZ sample rate, such as 16 Hz over the plurality of cardiac cycles. In some examples, processing circuitry 15 and/or processing circuitry 102 may filter the interpolated signal to attenuate any signal outside of a typical respiratory rate. For example, processing circuitry 15 and/or processing circuitry 102 may apply specific low pass filters and/or high pass filters to the interpolated signal. Processing circuitry 15 and/or processing circuitry 102 may then use a peak detection, a valley detection, or zero crossing detection technique to calculate the respiratory rate of patient 14. By taking LeadZ measurements at least once per cardiac cycle such as right after a ventricle pace or ventricle sense, in optional combination with providing interpolated LeadZ measurements, processing circuitry can determine a waveform such as that of graph 140 that shows peaks which may correspond to breaths, allowing the respiration rate and respiration cycle to be determined. In some examples, IMD 16 may be configured to alter the pacing rate to coincide with the respiration cycle and restore RSA.

Figure 5:
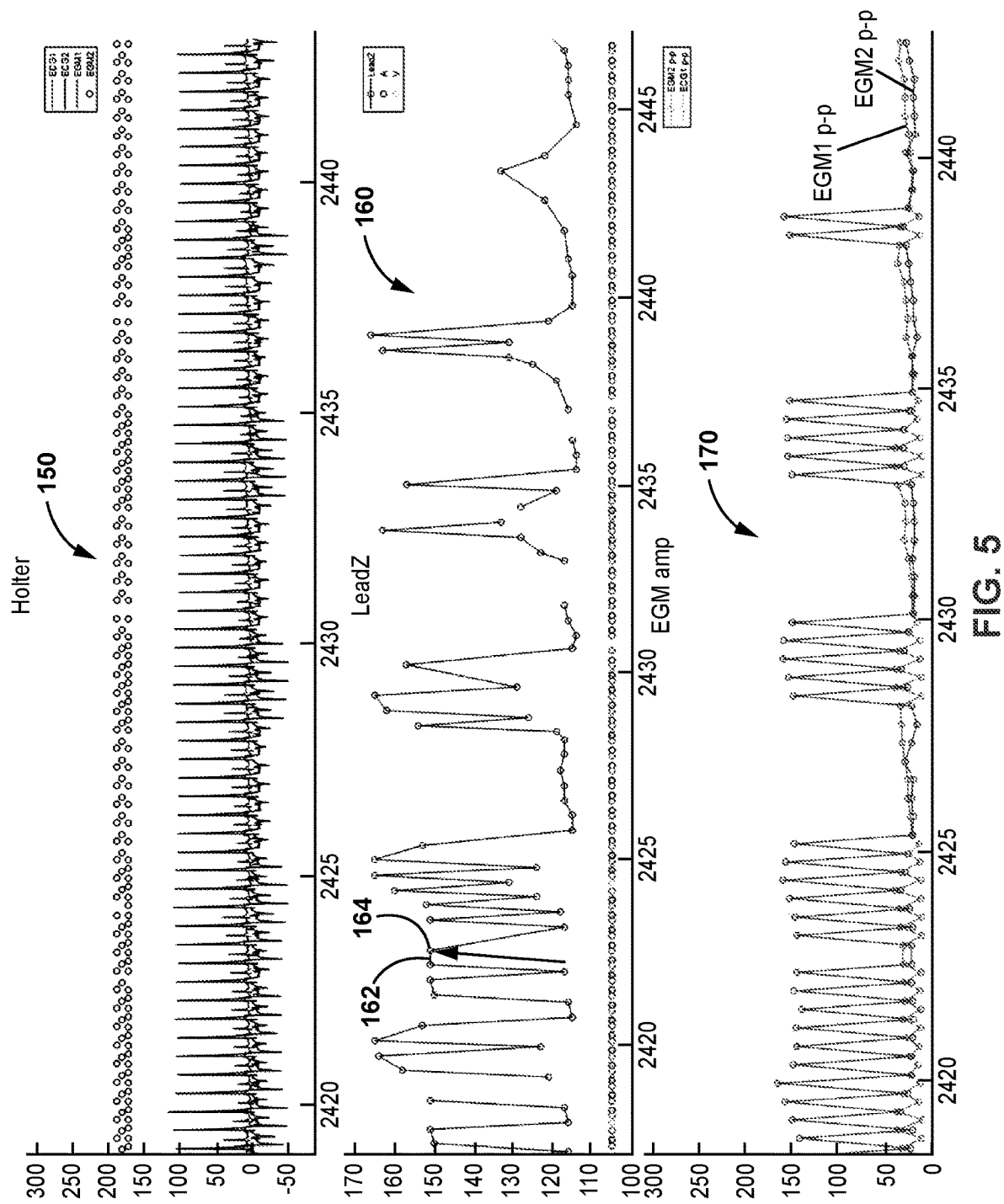
FIG. 5 is a graphical diagram illustrating LeadZ sensing for physiological parameters other than respiration.

FIG. 5 is a graphical diagram illustrating LeadZ sensing for physiological parameters other than respiration. A plurality of measurements of LeadZ may be made during a respective cardiac cycle. For example, a fixed time period between measurements may be employed to sense LeadZ a plurality of times during a single cardiac cycle. In another example, a second measurement (or more) of LeadZ may be triggered by a sensed parameter, such as a T wave, peak QRS amplitude, or the like. Graph 150 depicts sensed cardiological activity using a Holter monitor. Graph 160 depicts the sensed LeadZs. Graph 170 depicts a cardiac electrogram QRS amplitude, e.g., sensed by IMD 16.

The data in graph 160 shows two overlapping waveforms within a cardiac cycle, with one shifted relative to the other, such as waveform 162 and waveform 164. This change within a beat may be used to determine physiological or device-dependent parameters. For example, processing circuitry 15 and/or processing circuitry of external computing device 24 may determine a first sensed LeadZ, determine a second sensed LeadZ, determine a first difference between the first sensed LeadZ and the second sensed LeadZ, and determine a parameter based at least in part on the first difference. The first sensed LeadZ and the second sensed LeadZ may be sensed during a same first cardiac cycle of a heart. In some examples, the heart is receiving pacing.

In some examples, this shift may be representative of the instantaneous right ventricular volume at the time of the sensing. In this manner, the sensed LeadZ at a time in the cardiac cycle not coinciding with a pace or during the absolute refractory period may represent the volume of the right ventricle at that point in time. For example, during a typical cardiac cycle, the LeadZ will start low at the beginning systole and increase to a peak followed by decreasing during diastole. This periodic, intrabeat oscillation of the LeadZ corresponds with the changing volume in the heart during a cardiac cycle. Interventions that change the time course of volume change in the right ventricle (or other chamber) could be measured by taking one or more additional LeadZ measurements during a cardiac cycle. By IMD 16 sensing LeadZ a plurality of times during a single cardiac cycle, processing circuitry 15 and/or processing circuitry 102 may in turn determine contractility, ejection fraction, analyze capture management of paced beats, evaluate effective capture of paced beats, analyze rate responsive pacing, analyze rate adaptive atrioventricular intervals, analyze capture of selective or area LBBB or bundle of His, analyze entrained capture of ATP, determine perfusion of tachyarrhythmia, detect pulseless electrical activation (where a QRS complex is not accompanied by a meaningful beat), etc. Long term tracking of such physiologic parameters (e.g., ejection fraction or contractility) can in turn be used to provide indications of worsening heart failure.

A description of the functioning of each technique and practical use for each parameter are outlined below. Contractility surrogates are now discussed. There may be relationships between the real-time high capture-frequency impedance signal from a number of vectors across the heart chambers to contractility surrogates, such as peak or maximum dp/dt (the rate of pressure change over time) or volume changes. In effect, sensing a plurality of LeadZs during a cardiac cycle may function as taking a subsample of this high capture-frequency signal. Processing circuitry 15 and/or processing circuitry 102 may use the subsample to infer changes in contractility. For example, IMD 16 may sense LeadZ at the pace or sense, and again at another time point in the same cardiac cycle. The change in LeadZ between the two time points in a beat may be used to infer a change in volume (or contractility value) during that cycle. A range of these changes may be used to establish different values of contractility or volume change. For example, IMD 16 may change pacing configurations and sense LeadZ for each of the pacing configurations at a plurality of points in a cardiac cycle. Processing circuitry 15 and/or processing circuitry 102 may chose a particular pacing configuration based on the pacing configuration that demonstrates the largest improvement in contractility.

For example, processing circuitry 15 and/or processing circuitry 102 may change a pacing configuration from a first pacing configuration to a second pacing configuration, wherein the changed pacing configuration is used to pace a heart. The pacing configuration may include a pacing rate and/or electrodes used to pace the heart. Processing circuitry 15 and/or processing circuitry 102 may determine a third sensed LeadZ and determine a fourth sensed Lead. Processing circuitry 15 and/or processing circuitry 102 may determine a second difference between the third sensed LeadZ and the fourth sensed LeadZ and compare the first difference and the second difference. Processing circuitry 15 and/or processing circuitry 102 may select a pacing configuration of either the first pacing configuration and the second pacing configuration based on the comparison. The third sensed LeadZ and the fourth sensed LeadZ may be sensed during a same second cardiac cycle.

Capture management is now discussed. Whether a paced beat is captured or not will likely result in a different contractility or time course of chamber volume change. Processing circuitry 15 and/or processing circuitry 102 may use this change to determine whether a beat was captured or not. For example, during a capture management test, during regular pacing, or thereafter, processing circuitry 15 and/or processing circuitry 102 may compare the difference in LeadZ intrabeat changes beat-to-beat. If there is a marked difference in this intrabeat change from one beat to the next, then processing circuitry 15 and/or processing circuitry 102 may determine that the beat that is out of a predetermined range is a non-captured beat. For example, processing circuitry 15 and/or processing circuitry 102 may determine an intrabeat change during a time period of known capture, such as during high pacing outputs, and compare this intrabeat change to an intrabeat change during a time period of unknown capture, such as when pacing outputs are lower. If the characteristics of the intrabeat change between those two determined intrabeat changes are relatively unchanged for those two time periods, processing circuitry 15 and/or processing circuitry 102 may determine that capture has been maintained at the power pacing outputs. If the characteristics of the intrabeat change are relatively different for those two time periods, processing circuitry 15 and/or processing circuitry 102 may determine that capture has likely been lost at the power pacing outputs.

In some examples, processing circuitry 15 and/or processing circuitry 102 may store the value of this intrabeat change in a non-captured beat, and compare each new intrabeat change value established intrabeat change of the non-captured beat to determine if the beat is captured. In some examples, processing circuitry 15 and/or processing circuitry 102 may update the predetermined range based on the intrabeat change of the non-captured beat.

For example, processing circuitry 15 and/or processing circuitry 102 may determine a third sensed LeadZ and determine a fourth sensed LeadZ. The third sensed LeadZ and the fourth sensed LeadZ may be sensed during a same second cardiac cycle. Processing circuitry 15 and/or processing circuitry 102 may determine a second difference between the third sensed LeadZ and the fourth sensed LeadZ and compare the first difference and the second difference. Processing circuitry 15 and/or processing circuitry 102 may determine whether the second difference differs from the first difference by more than a first predetermined amount. Processing circuitry 15 and/or processing circuitry 102 may, based on the second difference differing from the first difference by more than the first predetermined amount, classify the same second cardiac cycle as a non-captured beat.

For example, processing circuitry 15 and/or processing circuitry 102 may determine whether the first difference is greater than or equal to a predetermined threshold and based on the first difference being greater or equal to the predetermined threshold, classify the beat as a non-captured beat. Processing circuitry 15 and/or processing circuitry 102 may update the first predetermined threshold based on the first difference.

Effective capture is now discussed. Similar to the discussion above regarding capture management, processing circuitry 15 and/or processing circuitry 102 may use the plurality of sensed LeadZs during a cardiac cycle to determine whether a paced beat is not captured, is completely captured, or is pseudofused. A pseudofused capture is an ineffective pacemaker spike on a spontaneous P or QRS complex. For example, processing circuitry 15 and/or processing circuitry 102 may use the intrabeat LeadZ changes to categorize a beat as one of the three categories based on the value of the change value.

For example, processing circuitry 15 and/or processing circuitry 102 may determine a fifth sensed LeadZ and determine a sixth sensed LeadZ. The fifth sensed LeadZ and the sixth sensed LeadZ may be sensed during a same third cardiac cycle. Processing circuitry 15 and/or processing circuitry 102 may determine a third difference between the fifth sensed LeadZ and the sixth sensed LeadZ and compare the first difference and the third difference. Processing circuitry 15 and/or processing circuitry 102 may determine whether the third difference differs from the first difference by more than a second predetermined amount and less than the first predetermined amount. Processing circuitry 15 and/or processing circuitry 102 may, based on the third difference differing from the first difference by more than the second predetermined amount and less than the first predetermined amount, classify the same third cardiac cycle as a pseudofused beat.

In some examples, processing circuitry 15 and/or processing circuitry 102 may determine a "degree" of pseudofusion based on the degree of change in the intrabeat LeadZ measurement. For example, the pacing may be ineffective because the heart chamber may have already spontaneously depolarized so the pacing did not cause the chamber to contract.

Rate response is now discussed. If IMD 16 senses the second LeadZ during the cardiac cycle at a fixed time point, this might result in a different intrabeat LeadZ change during exercise or when a change in heart rate is desired. Over a relatively long time period, processing circuitry 15 and/or processing circuitry 102 may monitor the value of the intrabeat LeadZ change. If the value of the intrabeat LeadZ change drifts outside of a predetermined expected range (for example if the value differs by a predetermined fixed amount), then processing circuitry 15 and/or processing circuitry 102 may determine that the heart rate of heart 12 of patient 14 rate is not sufficient to keep up with demand. IMD 16 may then change a pacing rate to correct the intrabeat LeadZ change and bring the intrabeat LeadZ change back within the expected predetermined or programmed range.

For example, processing circuitry 15 and/or processing circuitry 102 may determine a plurality of sensed LeadZs during each cardiac cycle over a period of time. Processing circuitry 15 and/or processing circuitry 102 may determine a respective difference between the plurality of sensed LeadZs during each cardiac cycle over the period of time. Processing circuitry 15 and/or processing circuitry 102 may compare a first respective difference to a second respective difference. and determine that the first respective difference differs from the second respective difference by more than a predetermined amount. Processing circuitry 15 and/or processing circuitry 102 may, based on the first respective difference differing from the second respective difference more than the predetermined amount, change a pacing rate.

Rate-adaptive AV interval is now discussed. Similar to the techniques for rate response and for contractility assessment, an intrabeat change of sensed LeadZ may be used to establish a proper AV interval to maximize contractility. For example, processing circuitry 15 and/or processing circuitry 102 may determine a third sensed LeadZ and determine a fourth sensed LeadZ. The third sensed LeadZ and the fourth sensed LeadZ may be sensed during a same second cardiac cycle and the time difference between sensing the first sensed LeadZ and the second sensed LeadZ may be equal to a time difference of sensing the third sensed LeadZ and the fourth sensed LeadZ. Processing circuitry 15 and/or processing circuitry 102 may determine a second difference between the third sensed LeadZ and the fourth sensed LeadZ. Processing circuitry 15 and/or processing circuitry 102 may compare the first difference and the second difference and determine whether the second difference differs from the first difference by more than a first predetermined amount. Processing circuitry 15 and/or processing circuitry 102 may, based on the second difference differing from the first difference by more than the first predetermined amount, change a pacing configuration.

Figure 6:
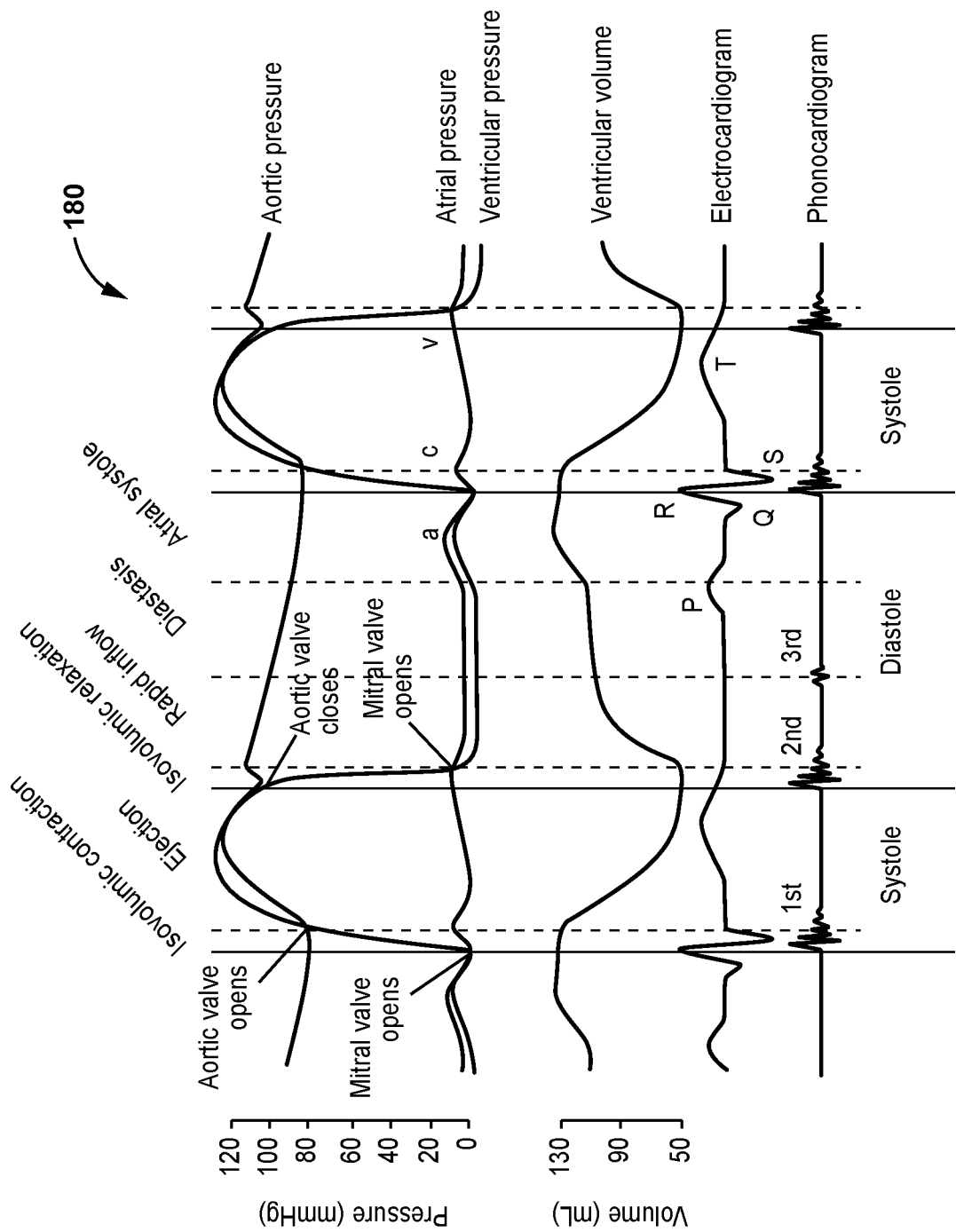
FIG. 6 is a graphical diagram illustrating changes in pressure and volume over a cardiac cycle.

FIG. 6 is a graphical diagram 180 illustrating changes in pressure and volume over a cardiac cycle. For example, if two measurements are taken at a fixed time apart, processing circuitry 15 and/or processing circuitry 102 may use the difference in intrabeat values of LeadZ to determine changes in volumes or contractility between the two time points. Processing circuitry 15 and/or processing circuitry 102 may use the difference in intrabeat values of LeadZ to determine if a beat is captured or not captured. Additionally, processing circuitry 15 and/or processing circuitry 102 may use the difference in intrabeat values of LeadZ to determine other measurements of mechanical action, like effective capture. Processing circuitry 15 and/or processing circuitry 102 may use the difference in intrabeat values of LeadZ to optimize pacing therapy, or to perform other techniques of this disclosure.

In some examples, processing circuitry 15 and/or processing circuitry 102 may use the difference in intrabeat values to determine whether an ATP series of stimulation pulses is entrained or not, to determine whether a cardiac rhythm is accompanied by a beating ventricle, to detect pulseless electrical activity, to determine whether a fast rhythm is perfusing or not, or to determine the necessity of shock.

Figure 7:
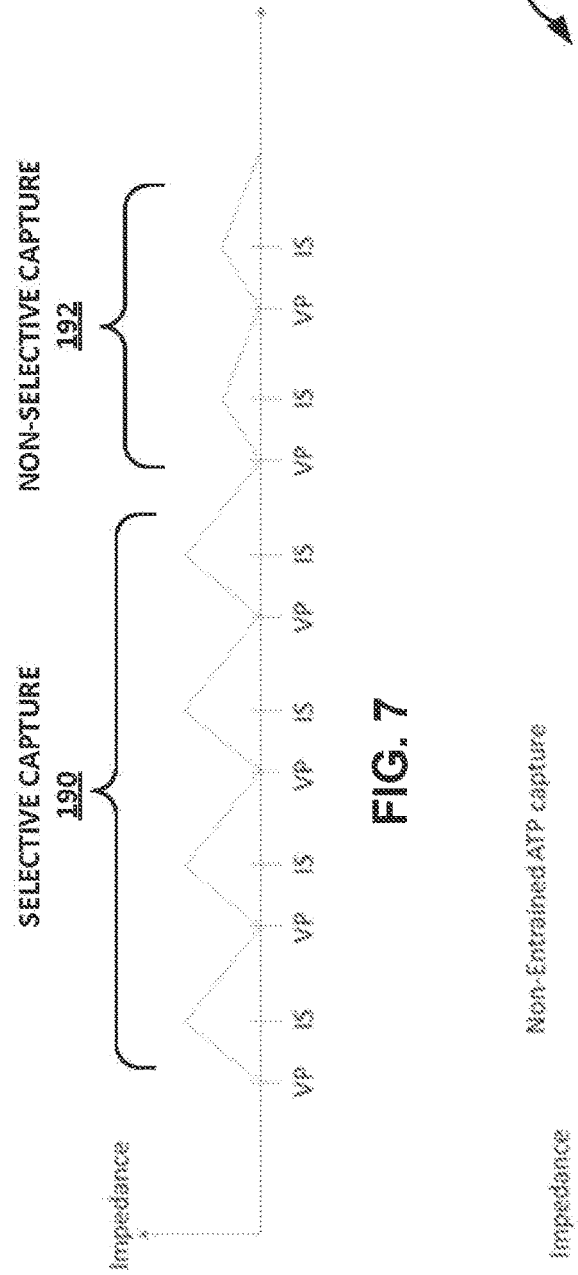
FIG. 7 is a graphical diagram illustrating an example determination of capture of selective or area LBBB or bundle of His.

FIG. 7 is a graphical diagram illustrating an example determination of capture of selective or area LBBB or bundle of His. For example, processing circuitry 15 and/or processing circuitry 102 may use the difference between the sensed LeadZ at pace (VP) and second sensed LeadZ (IS) to determine capture. Selective capture would be expected to produce a more "normal" electrical activation pattern and thus a stronger contraction. This would result in a higher 2nd impedance measurement and greater difference from the VP measure. A non-selective paced beat would be expected to have a lesser contraction. Thus, the first four beats represent selective capture 190 and the last two beats represent non-selective capture 192. For example, processing circuitry 15 and/or processing circuitry 102 may use the difference in intrabeat LeadZ to determine selective capture of LBBB or bundle of His.

For example, processing circuitry 15 and/or processing circuitry 102 may determine a third sensed LeadZ and determine a fourth sensed LeadZ. The third sensed LeadZ and the fourth sensed LeadZ may be sensed during a same second cardiac cycle. processing circuitry 15 and/or processing circuitry 102 may determine a second difference between the third sensed LeadZ and the fourth sensed LeadZ and compare the first difference and the second difference. Processing circuitry 15 and/or processing circuitry 102 may determine whether the second difference differs from the first difference by more than a predetermined amount. Processing circuitry 15 and/or processing circuitry 102 may, based on the second difference differing from the first difference by more than the first predetermined amount, determine that the same second cardiac cycle is a non-selective paced beat.

Figure 8:
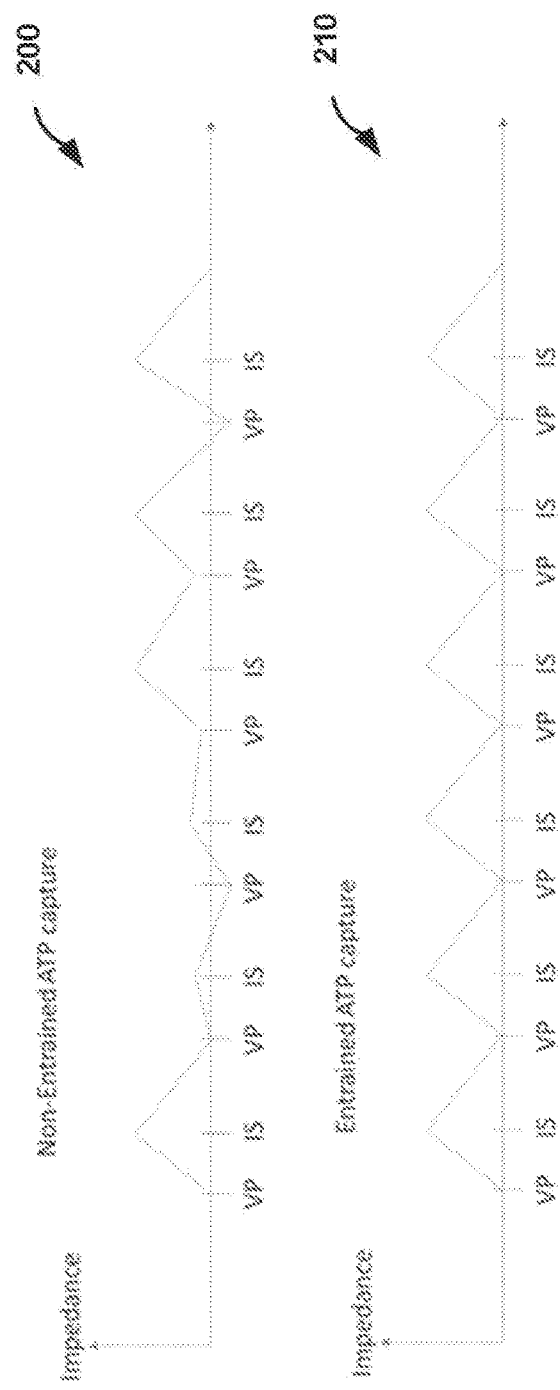
FIG. 8 is a graphical diagram illustrating an example determination of entrainment of ATP.

FIG. 8 is a graphical diagram illustrating an example determination of entrainment of ATP. For example, processing circuitry 15 or processing circuitry 102 may determine entrainment of ATP capture by determining the pattern of both the VP and IS LeadZ sensed signals. In non-entrainment of ATP, the ventricular paces may not be captured, and thus the sensed LeadZs would not be sensed at the same points in time of each cardiac cycle. As a result, there would likely be a random pattern as shown in graph 200. However, in graph 210, an entrained series of paces is shown with a more consistent shape.

For example, processing circuitry 15 and/or processing circuitry 102 may determine a third sensed LeadZ and determine a fourth sensed LeadZ. The third sensed LeadZ and the fourth sensed LeadZ may be sensed during a same second cardiac cycle. Processing circuitry 15 and/or processing circuitry 102 may determine a second difference between the third sensed LeadZ and the fourth sensed LeadZ and compare the first difference and the second difference. Processing circuitry 15 and/or processing circuitry 102 may determine whether the second difference differs from the first difference by more than a predetermined amount. Processing circuitry 15 and/or processing circuitry 102 may, based on the second difference differing from the first difference by more than the first predetermined amount, determine that the same second cardiac cycle is a non-entrained antitachycardia pulse captured beat.

In a similar manner, processing circuitry 15 may determine a tachyarrhythmia to be shockable or not shockable, as to whether the rhythm may be perfusing or non-perfusing. A perfusing rhythm would be expected to show ventricular contraction with each beat, and thus should show an up-down pattern (such as in graph 210) between the two sensed LeadZs, or with an up-down amplitude above a certain predetermined threshold (which may be absolute or relative to a baseline LeadZ amplitude of patient 14). For example, processing circuitry 15 may determine whether the first difference is greater than or equal to a first threshold and, based on the first difference being greater than the first threshold, determine the first cardiac cycle to be a perfusing beat.

Pulseless electrical activity is the absence of a perfusing pulse with the presence of a cardiac rhythm. The cardiac rhythm, however, may not be a normal rhythm, but may be regular or fast enough to potentially allow normal perfusion. There are a number of causes of pulseless electrical activity, for example electro-mechanical dissociation. In this case, IMD 16 may sense a loss of the regular up-down pattern of multiple LeadZ senses during a cardiac cycle (such as in graph 200).

For example, processing circuitry 15 and/or processing circuitry 102 may determine a third sensed LeadZ and determine a fourth sensed LeadZ. The third sensed LeadZ and the fourth sensed LeadZ may be sensed during a same second cardiac cycle. Processing circuitry 15 and/or processing circuitry 102 may determine a second difference between the third sensed LeadZ and the fourth sensed LeadZ and compare the first difference and the second difference. Processing circuitry 15 and/or processing circuitry 102 may determine whether the second difference differs from the first difference by more than a first predetermined amount. Processing circuitry 15 and/or processing circuitry 102 may, based on the second difference differing from the first difference by more than the first predetermined amount, classify the same second cardiac cycle as pulseless electrical activity.

Timing of the plurality of LeadZ senses during a cardiac cycle which processing circuitry 15 and/or processing circuitry 102 may use to determine intrabeat LeadZ changes is now discussed. In some examples, IMD 16 may overdrive pacing to create a constant rate and chamber capture. This may be desirable to ensure that the first LeadZ sense during a pace is consistently taken during a paced beat. In the case of intermittent pacing and sensing, the paced beat LeadZ would be sensed during the pace, and during a sensed beat, the LeadZ sense would be taken after the sense and during the absolute refractory period. This baseline value could change from beat to beat, so a consistent baseline may be desired.

In another example, IMD 16 may sense LeadZ at a fixed time after a first event. For example, IMD 16 may sense the first LeadZ during the cardiac cycle during the paced or sensed event. IMD 16 may then sense a second LeadZ at a fixed time point after that (e.g., after 400 ms). This technique may be beneficial when determining changes in intrabeat LeadZ that would occur as a result of patient activity or changing demand (e.g., rate response or rate-adaptive atrio-ventricular interval).

In another example, IMD 16 may use a rate adaptive time after a first event. For example, IMD 16 may sense the first LeadZ during the cardiac cycle during the paced or sensed event. IMD 16 may then sense a second LeadZ at a time that may be relative to the overall cardiac cycle length, such as 40% or 50% of the previous R-R interval.

In another example, IMD 16 may use event driven timing of the second LeadZ sense. For example, IMD 16 may sense the first LeadZ during the cardiac cycle during the paced or sensed event. IMD 16 may then sense a second LeadZ at a time of a subsequent event, such as a T wave.

In addition to using changes in intrabeat LeadZ to determine the parameters discussed herein, processing circuitry 15 and/or processing circuitry 102 may use the timing from pace or sense to the T wave sense. For example, changes in this timing could be related to changes in capture or effective capture, as the timing of the T wave may be expected to change.

Figure 9:
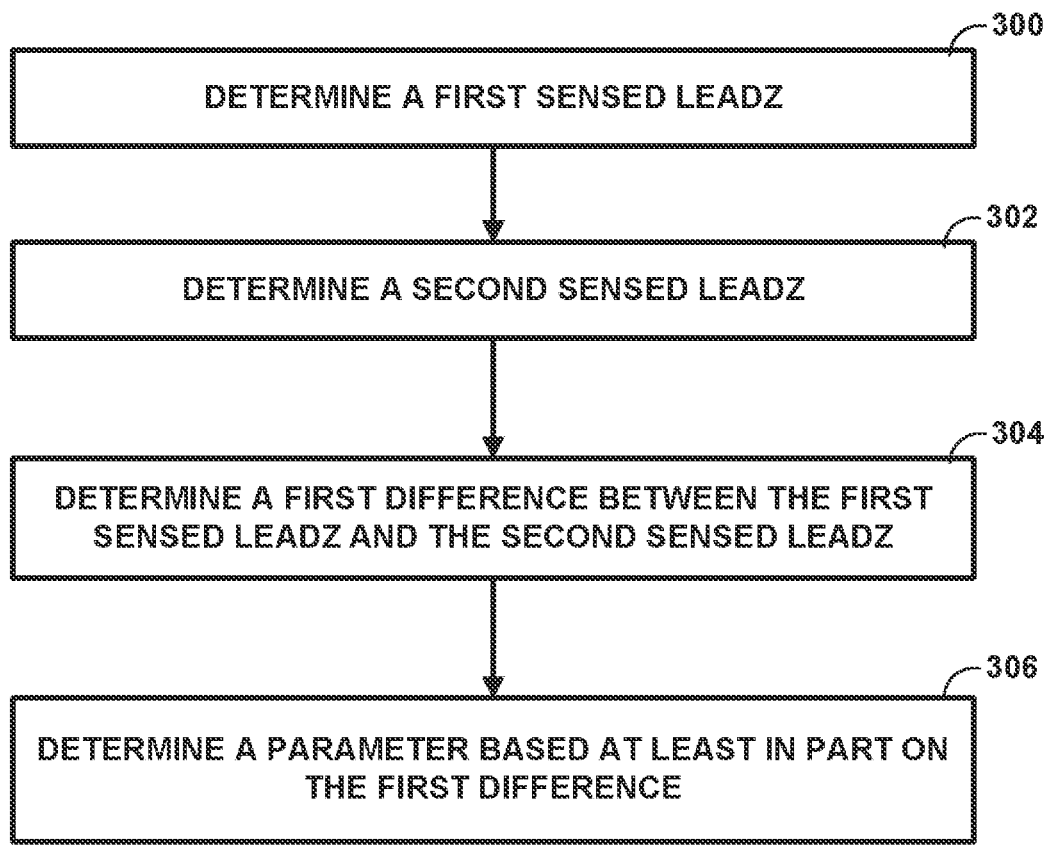
FIG. 9 is a flowchart illustrating another example of configuration techniques in accordance with this disclosure.

FIG. 9 is a flowchart illustrating an example of the use of LeadZ in accordance with the techniques of this disclosure. Processing circuitry 15 and/or processing circuitry 102 may determine a first sensed LeadZ (300). For example, IMD 16 may sense a LeadZ using a right ventricle ring electrode and a right ventricle coil electrode. Processing circuitry 15 may determine the first sensed LeadZ based on the sensing. In some examples, IMD 16 may communicate with external computing device 24 and forward the first sensed LeadZ to external computing device 24. Processing circuitry 102 may determine the first sensed LeadZ by reading the first sensed LeadZ from storage device(s) 108 or from communication circuitry 106.

Processing circuitry 15 and/or processing circuitry 102 may determine a second sensed LeadZ (302). For example, IMD 16 may sense a LeadZ using a right ventricle ring electrode and a right ventricle coil electrode. Second sensed LeadZ may be taken during the same cardiac cycle or during an adjacent cardiac cycle (e.g., during the same phase). Processing circuitry 15 may determine the second sensed LeadZ based on the sensing. In some examples, IMD 16 may communicate with external computing device 24 and forward the second sensed LeadZ to external computing device 24. Processing circuitry 102 may determine the second sensed LeadZ by reading the second sensed LeadZ from storage device(s) 108 or from communication circuitry 106.

Processing circuitry 15 and/or processing circuitry 102 may determine a first difference between the first sensed LeadZ and the second sensed LeadZ (304). For example, processing circuitry 15 and/or processing circuitry 102 may subtract the first LeadZ from the second LeadZ or may subtract the second LeadZ from the first LeadZ. Processing circuitry 15 and/or processing circuitry 102 may determine a parameter based at least in part on the first difference (306). For example, processing circuitry 15 and/or processing circuitry 102 may determine physiologic indices of contractility, whether a beat is a non-captured beat, whether a beat is a pseudofused beat, whether pacing parameters should changed, whether atrioventricular intervals should be changed, whether capture of left bundle branch block (LBBB) and bundle of His are selective, whether capture of antitachycardia pacing (ATP) is entrained, whether perfusion of tachycardia exists, whether pulseless electrical activation is detected, the volume or ejection fraction of the heart, the respiration rate, the current respiration state (e.g., inspiration or expiration) or the like. In some examples, the first sensed LeadZ and the second sensed LeadZ are sensed during a same first cardiac cycle of a heart that is receiving pacing. Such measurements may determine physiologic indices affiliated with the cardiac cycle (e.g., ejection fraction). Additionally, or alternatively, the first sensed LeadZ and the second sensed LeadZ are sensed during different cardiac cycles (e.g., adjacent cycles) of a heart that is receiving pacing. Such measurements may determine physiologic indices affiliated with the respiratory cycle.

In some examples, processing circuitry 15 and/or processing circuitry 102 may change a pacing configuration from a first pacing configuration to a second pacing configuration, wherein the changed pacing configuration is used to pace a heart. The pacing configuration may include a pacing rate and/or an electrode combination used to pace the heart. Processing circuitry 15 and/or processing circuitry 102 may determine a third sensed LeadZ. Processing circuitry 15 and/or processing circuitry 102 may determine a fourth sensed LeadZ. Processing circuitry 15 and/or processing circuitry 102 may determine a second difference between the third sensed LeadZ and the fourth sensed LeadZ. Processing circuitry 15 and/or processing circuitry 102 may compare the first difference and the second difference. Processing circuitry 15 and/or processing circuitry 102 may select a pacing configuration of either the first pacing configuration or the second pacing configuration based on the comparison. The third sensed LeadZ and the fourth sensed LeadZ are sensed during a same second cardiac cycle or adjacent cycles.

In some examples, processing circuitry 15 and/or processing circuitry 102 may determine whether the first difference is greater than or equal to a predetermined threshold. Based on the determination of whether first difference is greater or equal to the predetermined threshold, processing circuitry 15 and/or processing circuitry 102 may classify the beat as a non-captured beat. In some examples, if the first difference is greater than or equal to the predetermined threshold, the beat may be classified as a non-captured beat. In other examples, if the first difference is not greater than or equal to the predetermined threshold, the beat may be classified as a non-captured beat.

In some examples, processing circuitry 15 and/or processing circuitry 102 may update the first predetermined threshold based on the first difference.

In some examples, processing circuitry 15 and/or processing circuitry 102 may determine a third sensed LeadZ. Processing circuitry 15 and/or processing circuitry 102 may determine a fourth sensed LeadZ, wherein the third sensed LeadZ and the fourth sensed LeadZ are sensed during a same second cardiac cycle. Processing circuitry 15 and/or processing circuitry 102 may determine a second difference between the third sensed LeadZ and the fourth sensed LeadZ. Processing circuitry 15 and/or processing circuitry 102 may compare the first difference and the second difference. Processing circuitry 15 and/or processing circuitry 102 may determine whether the second difference differs from the first difference by more than a first predetermined amount. Processing circuitry 15 and/or processing circuitry 102 may, based on the second difference differing from the first difference by more than the first predetermined amount, classify the same second cardiac cycle as a non-captured beat or as pulseless electrical activity.

In some examples, processing circuitry 15 and/or processing circuitry 102 may determine a fifth sensed LeadZ. Processing circuitry 15 and/or processing circuitry 102 may determine a sixth sensed LeadZ, wherein the fifth sensed LeadZ and the sixth sensed LeadZ are during a same third cardiac cycle. Processing circuitry 15 and/or processing circuitry 102 may determine a third difference between the fifth sensed LeadZ and the sixth sensed LeadZ. Processing circuitry 15 and/or processing circuitry 102 may compare the first difference and the third difference. Processing circuitry 15 and/or processing circuitry 102 may determine whether the third difference differs from the first difference by more than a second predetermined amount and less than the first predetermined amount. Processing circuitry 15 and/or processing circuitry 102 may, based on the third difference differing from the first difference by more than the second predetermined amount and less than the first predetermined amount, classify the same third cardiac cycle as a pseudofused beat.

In some examples, processing circuitry 15 and/or processing circuitry 102 determine a plurality of sensed LeadZs during each cardiac cycle over a period of time. Processing circuitry 15 and/or processing circuitry 102 may determine a respective difference between the plurality of sensed LeadZs during each cardiac cycle over the period of time. Processing circuitry 15 and/or processing circuitry 102 may compare a first respective difference to a second respective difference. Processing circuitry 15 and/or processing circuitry 102 may determine that the first respective difference differs from the second respective difference by more than a predetermined amount. Based on the first respective difference differing from the second respective difference more than the predetermined amount, processing circuitry 15 and/or processing circuitry 102 may change a pacing rate.

In some examples, processing circuitry 15 and/or processing circuitry 102 may determine a third sensed LeadZ. Processing circuitry 15 and/or processing circuitry 102 may determine a fourth sensed LeadZ, wherein the third sensed LeadZ and the fourth sensed LeadZ are sensed during a same second cardiac cycle and wherein a time difference between sensing the first sensed LeadZ and the second sensed LeadZ is equal to a time difference of sensing the third sensed LeadZ and the fourth sensed LeadZ. Processing circuitry 15 and/or processing circuitry 102 may determine a second difference between the third sensed LeadZ and the fourth sensed LeadZ. Processing circuitry 15 and/or processing circuitry 102 may compare the first difference and the second difference. Processing circuitry 15 and/or processing circuitry 102 may determine whether the second difference differs from the first difference by more than a first predetermined amount. Processing circuitry 15 and/or processing circuitry 102 may, based on the second difference differing from the first difference by more than the first predetermined amount, change a pacing configuration.

In some examples, processing circuitry 15 and/or processing circuitry 102 may determine a third sensed LeadZ. Processing circuitry 15 and/or processing circuitry 102 may determine a fourth sensed LeadZ, wherein the third sensed LeadZ and the fourth sensed LeadZ are sensed during a same second cardiac cycle. Processing circuitry 15 and/or processing circuitry 102 may determine a second difference between the third sensed LeadZ and the fourth sensed LeadZ. Processing circuitry 15 and/or processing circuitry 102 may compare the first difference and the second difference. Processing circuitry 15 and/or processing circuitry 102 may determine whether the second difference differs from the first difference by more than a first predetermined amount. Processing circuitry 15 and/or processing circuitry 102 may, based on the second difference differing from the first difference by more than the first predetermined amount, determine that the same second cardiac cycle is a non-selective paced beat or a non-entrained antitachycardia pulse captured beat.

In some examples, processing circuitry 15 and/or processing circuitry 102 may determine whether the first difference is greater than or equal to a first threshold. Processing circuitry 15 and/or processing circuitry 102 may, based on the first difference being greater than the first threshold, determine the first cardiac cycle to be a perfusing beat.

In some examples, IMD 16 may overdriving the pacing. In some examples, the first sensed LeadZ is during a pace or during a sensed beat and the second sensed LeadZ is during an absolute refractory period subsequent to the pace or sensed beat. In some examples, the first sensed LeadZ is during a pace or during sensed beat and the second sensed LeadZ is at a predetermined time after the sensing the first LeadZ. In some examples, the first sensed LeadZ is during a pace or during sensed beat and the second sensed LeadZ is at a predetermined portion of a previous R-R interval. In some examples, the first sensed LeadZ is during a pace or during sensed beat, and processing circuitry 15 may determine a sensed cardiac event, wherein timing of the sensing of the second sensed LeadZ is based on determining the sensed cardiac event.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a non-transitory computer-readable medium, such as a computer-readable storage medium, containing instructions. Instructions embedded or encoded in a non-transitory computer-readable storage medium may cause a programmable processor, or other processor, to perform the method, e.g., when the instructions are executed. Non-transitory computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

This disclosure contains the following non-limiting examples.

Various examples have been described. These and other examples are within the scope of the following claims.

What is claimed is:
1. A method comprising:
sensing, via electrodes of a lead, a first sensed lead impedance (LeadZ) during a first cardiac cycle;
sensing, via the electrodes of the lead, a second sensed LeadZ during the first cardiac cycle;
determining, by processing circuitry, a first difference between a first value of the first sensed LeadZ and a second value of the second sensed LeadZ;
determining, by the processing circuitry, that the first difference is greater than or equal to a first threshold;
based on the first difference being greater than the first threshold, determining, by the processing circuitry, the first cardiac cycle to include a sufficiently perfusing beat;
sensing, via the electrodes of the lead, a third sensed LeadZ;
sensing, via the electrodes of the lead, a fourth sensed LeadZ;
determining, by the processing circuitry, a second difference between a third value of the third sensed LeadZ and a fourth value of the fourth sensed LeadZ;
comparing, by the processing circuitry, the first difference and the second difference;
changing, by the processing circuitry, at least one of a pacing rate or an electrode used for pacing of a pacing configuration from a first pacing configuration to a second pacing configuration based on the comparison; and
applying, by a medical device, pacing to a patient using the second pacing configuration.

2. The method of claim 1, further comprising:
sensing, via the electrodes of the lead, a plurality of sensed LeadZs during adjacent cardiac cycles over a period of time, wherein the plurality of sensed LeadZs include the third sensed LeadZ and the fourth sensed LeadZ;
determining, by the processing circuitry, a respective difference between a plurality of values of the plurality of sensed LeadZs for each adjacent cardiac cycle over the period of time;

comparing, by the processing circuitry, a first respective difference to a second respective difference;

determining, by the processing circuitry, that the first respective difference differs from the second respective difference by more than a predetermined amount;

based on the first respective difference differing from the second respective difference more than the predetermined amount, changing, by the processing circuitry, the pacing rate from the second pacing rate to a third pacing rate; and applying, by the medical device, pacing to the patient at the third pacing rate.

3. The method of claim 2, wherein changing the pacing rate further comprises:

determining, by the processing circuitry, a respiratory state based on the respective differences between the plurality of values of the plurality of sensed LeadZs;

at least one of increasing, by the processing circuitry, the pacing rate during an inspiration respiratory state, or decreasing, by the processing circuitry, the pacing rate during an expiration respiratory state; and applying, by the medical device, pacing to the patient according to at least one of the increased pacing rate during the inspiration respiratory state or the decreased pacing rate during the expiration respiratory state.

4. The method of claim 1, further comprising:

determining, by the processing circuitry, whether the first difference is greater than or equal to a second threshold;

based on the determination of whether the first difference is greater than or equal to the second threshold, classifying, by the processing circuitry, a beat as a non-captured beat; and updating, by the processing circuitry, the second threshold based on the first difference.

5. The method of claim 1, further comprising:

sensing, via the electrodes of the lead, a fifth sensed LeadZ;

sensing, via the electrodes of the lead, a sixth sensed LeadZ, wherein the first sensed LeadZ and the second sensed LeadZ are sensed during the first cardiac cycle of a heart that is receiving pacing, and wherein the fifth sensed LeadZ and the sixth sensed LeadZ are sensed during a same second cardiac cycle of the heart that is receiving pacing;

determining, by the processing circuitry, a third difference between a fifth value of the fifth sensed LeadZ and a sixth value of the sixth sensed LeadZ;

comparing, by the processing circuitry, the first difference and the third difference;

determining, by the processing circuitry, that the third difference differs from the first difference by more than a first predetermined amount; and based on the third difference differing from the first difference by more than the first predetermined amount, classifying, by the processing circuitry, the same second cardiac cycle as a non-captured beat, a pulseless electrical activity, a non-selective paced beat, or a non-entrained antitachycardia pulse captured beat.

6. The method of claim 5, further comprising:

sensing, via the electrodes of the lead, a seventh sensed LeadZ;

sensing, via the electrodes of the lead, an eighth sensed LeadZ, wherein the seventh sensed LeadZ and the eighth sensed LeadZ are sensed during a same third cardiac cycle;

determining, by the processing circuitry, a fourth difference between a seventh value of the seventh sensed LeadZ and an eighth value of the eighth sensed LeadZ;

comparing, by the processing circuitry, the first difference and the fourth difference;

determining, by the processing circuitry, that the fourth difference differs from the first difference by more than a second predetermined amount and less than the first predetermined amount; and based on the fourth difference differing from the first difference by more than the second predetermined amount and less than the first predetermined amount, classifying, by the processing circuitry, the same third cardiac cycle as a pseudofused beat.

7. The method of claim 1, wherein the first sensed LeadZ is sensed during a pace or during a sensed beat and the second sensed LeadZ is sensed during an absolute refractory period subsequent to the pace or sensed beat or sensed at a predetermined time after the sensing the first sensed LeadZ.

8. The method of claim 1, wherein the first sensed LeadZ is sensed during a pace or during sensed beat, the method further comprising:

sensing a cardiac event, wherein timing of the sensing of the second sensed LeadZ is based on sensing the cardiac event.

9. The method of claim 1, further comprising controlling, based on the first cardiac cycle including a perfusing beat, the medical device to refrain from delivering a shock to a patient during the first cardiac cycle.

10. A system comprising:

memory configured to store a plurality of lead impedances (LeadZs) sensed by a medical device via electrodes of a lead; and processing circuitry communicatively coupled to the memory, the processing circuitry being configured to:

control the electrodes to sense a first sensed lead impedance (LeadZ) during a first cardiac cycle;

control the electrodes to sense a second sensed LeadZ during the first cardiac cycle;

determine a first difference between a first value of the first sensed LeadZ and a second value of the second sensed LeadZ;

determine that the first difference is greater than or equal to a first threshold;

based on the first difference being greater than the first threshold, determine the first cardiac cycle to include a sufficiently perfusing beat;

control the electrodes to sense a third sensed LeadZ;

control the electrodes to sense a fourth sensed LeadZ;

determine a second difference between a third value of the third sensed LeadZ and a fourth value of the fourth sensed LeadZ;

compare the first difference and the second difference;

change at least one of a pacing rate or electrode of a pacing configuration used for pacing by the medical device from a first pacing configuration to a second pacing configuration based on the comparison; and cause the medical device to apply pacing to a patient using the second pacing configuration, wherein the first sensed LeadZ and the second sensed LeadZ are sensed in a heart that is receiving the pacing from the medical device.

11. The system of claim 10, wherein the processing circuitry is further configured to:

control the electrodes to sense a plurality of sensed LeadZs during adjacent cardiac cycles over a period of time;

determine a respective difference between a plurality of values of the plurality of sensed LeadZs for each adjacent cardiac cycle over the period of time;

compare a first respective difference to a second respective difference;

determine that the first respective difference differs from the second respective difference by more than a predetermined amount;

based on the first respective difference differing from the second respective difference more than the predetermined amount, change the pacing rate from the second pacing rate to a third pacing rate; and cause the medical device to apply pacing to the patient at the third pacing rate.

12. The system of claim 11, wherein the processing circuitry is configured to:

determine a respiratory state based on the respective differences between the plurality of values of the plurality of sensed LeadZs;

at least one of increase the pacing rate during an inspiration respiratory state, or decrease the pacing rate during an expiration respiratory state; and cause the medical device to apply pacing to the patient according to at least one of the increased pacing rate during the inspiration respiratory state or the decreased pacing rate during the expiration respiratory state.

13. The system of claim 10, wherein the processing circuitry is further configured to:

determine that the first difference is greater than or equal to a second threshold;

based on the determination that the first difference being greater or equal to the second threshold, classify a beat as a non-captured beat; and update the second threshold based on the first difference.

14. The system of claim 10, wherein the processing circuitry is further configured to:

control the electrodes to sense a fifth sensed LeadZ;

control the electrodes to sense a sixth sensed LeadZ, wherein the first sensed LeadZ and the second sensed LeadZ are sensed during the first cardiac cycle of a heart that is receiving pacing, and wherein the fifth sensed LeadZ and the sixth sensed LeadZ are sensed during a same second cardiac cycle of the heart that is receiving pacing;

determine a third difference between a fifth value of the fifth sensed LeadZ and a sixth value of the sixth sensed LeadZ;

compare the first difference and the third difference;

determine that the third difference differs from the first difference by more than a first predetermined amount; and based on the third difference differing from the first difference by more than the first predetermined amount, classify the same second cardiac cycle as a non-captured beat, a pulseless electrical activity, a non-selective paced beat, or a non-entrained antitachycardia pulse captured beat.

15. The system of claim 14, wherein the processing circuitry is further configured to:

control the electrodes to sense a seventh sensed LeadZ;

control the electrodes to sense an eighth sensed LeadZ, wherein the seventh sensed LeadZ and the eighth sensed LeadZ are sensed during a same third cardiac cycle;

determine a fourth difference between a seventh value of the seventh sensed LeadZ and an eighth value of the eighth sensed LeadZ;

compare the first difference and the fourth difference;

determine that the fourth difference differs from the first difference by more than a second predetermined amount and less than the first predetermined amount; and based on the third difference differing from the first difference by more than the second predetermined amount and less than the first predetermined amount, classify the same third cardiac cycle as a pseudofused beat.

16. The system of claim 10, wherein the first sensed LeadZ is sensed during a pace or during a sensed beat and the second sensed LeadZ is sensed during an absolute refractory period subsequent to the pace or sensed beat or sensed at a predetermined time after the sensing the first sensed LeadZ.

17. The system of claim 10, wherein the first sensed LeadZ is sensed during a pace or during sensed beat, and wherein the processing circuitry is further configured to:

determine a sensed cardiac event, wherein timing of the sensing the second sensed LeadZ is based on determining the sensed cardiac event.

18. The system of claim 10, wherein the processing circuitry is further configured to control, based on the first cardiac cycle including a perfusing beat, the medical device to refrain from delivering a shock to a patient during the first cardiac cycle.

19. Non-transitory computer readable media storing instructions, which when executed by processing circuitry cause processing circuitry to:

control electrodes of a lead to sense a first sensed lead impedance (LeadZ) during a first cardiac cycle;

control the electrodes to sense a second sensed LeadZ during the first cardiac cycle;

determine a first difference between a first value of the first sensed LeadZ and a second value of the second sensed LeadZ;

determine whether the first difference is greater than or equal to a first threshold; and based on the first difference being greater than the first threshold, determine the first cardiac cycle to include a perfusing beat;

based on the first cardiac cycle including a sufficiently perfusing beat, control a medical device to refrain from delivering a shock to a patient during the first cardiac cycle;

control the electrodes to sense a third sensed LeadZ;

control the electrodes to sense a fourth sensed LeadZ;

determine a second difference between a third value of the third sensed LeadZ and a fourth value of the fourth sensed LeadZ;

compare the first difference and the second difference;

change at least one of a pacing rate or electrode used for pacing of a pacing configuration from a first pacing configuration to a second pacing configuration based on the comparison; and cause the medical device to apply pacing to the patient using the second pacing configuration, wherein the first sensed LeadZ and the second sensed LeadZ are sensed during a same cardiac cycle or during adjacent cardiac cycles of a heart that is receiving pacing.

* * * * *